March 19, 1935. J. A. BROSSART ET AL 1,995,113
BRAKE BEAM SUPPORT
Filed July 20, 1931   2 Sheets-Sheet 1
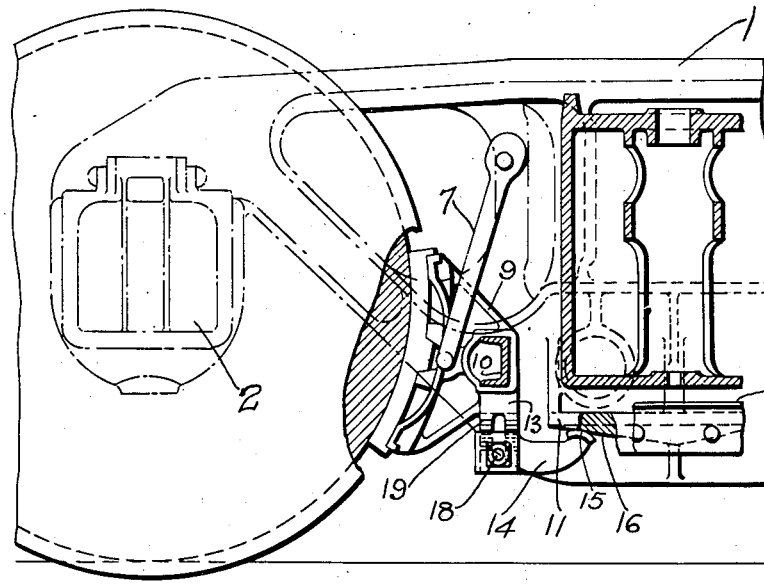
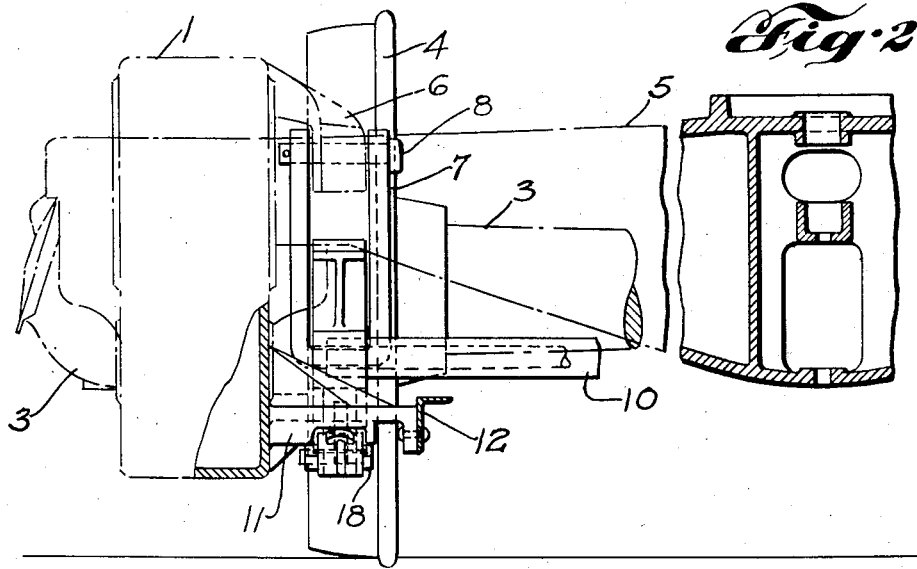
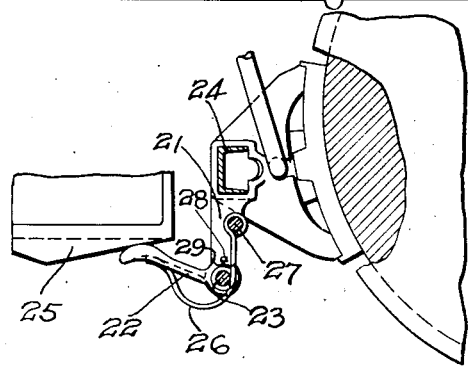
Inventors
John A. Brossart
Jonas D. Bigelow
Raymond W. Retterer
By Rodney Bedell
Attorney

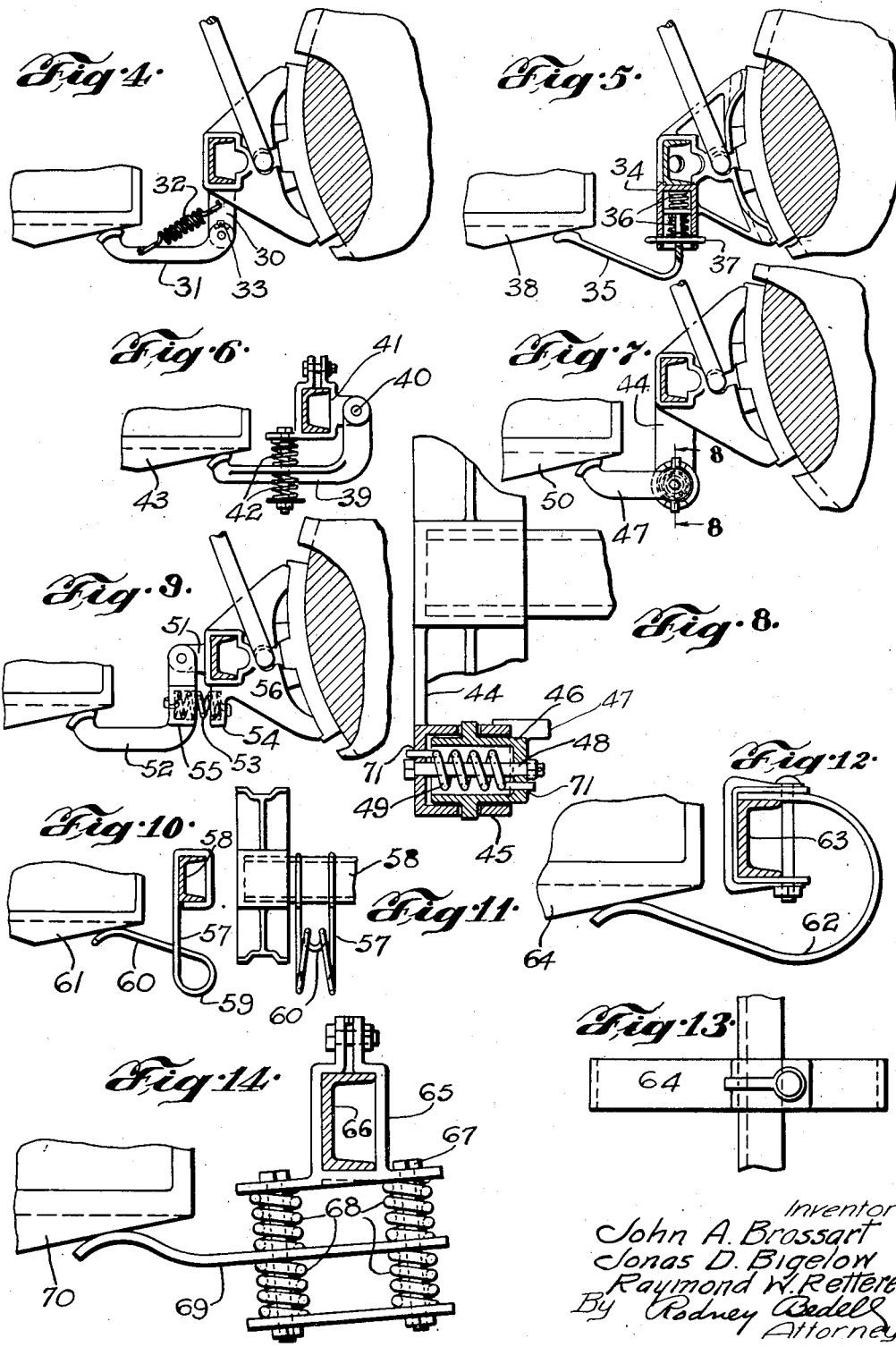

Patented Mar. 19, 1935

1,995,113

UNITED STATES PATENT OFFICE 1,995,113

BRAKE BEAM SUPPORT

John A. Brossart, Jonas D. Bigelow, and Raymond W. Retterer, Indianapolis, Ind., assignors to Chicago Railway Equipment Company, Chicago, Ill., a corporation of Illinois Application July 20, 1931, Serial No. 551,844

5 Claims. (Cl. 188—212)

The invention relates to railway rolling stock and more particularly to the guiding of the brake beam assembly including the beam proper, the brake head and shoe and the brake lever and maintaining the proper relation of the same to the wheel treads.

It has been a common practice to secure a brake beam guide and/or support member to the truck spring plank or to a bracket carried by the spring plank, the member extending under the brake beam and engaging the latter, or an element secured thereto, to cooperate with the brake beam hanger in keeping the brake beam properly positioned so as to maintain its face substantially concentric with the wheel to avoid dragging of the upper end of the brake shoe on the wheel and this member has a further function as a safety device to support the beam if the hanger should fail.

There is a type of truck which does not have a spring plank extending between the side frames of the truck and the present invention embodies a solution of the problem of providing adequate mounting for the brake beam guide member in such a truck. Briefly, the invention comprises the provision of a bracket on the side of the frame and extending inwardly therefrom and adjacent the level of the beam and at the rear thereof and the provision of a cooperating element secured to the brake beam and extending therefrom to engage the bracket.

In addition to the main object of the invention, as indicated above, it is desired to provide means for taking care of variations in the relative positions of the brake beam and side frame bracket arising from variations in manufacture and from wear of the parts in extended operation.

These and other detail objects are attained by the structures illustrated in the accompanying drawings, in which—

Figure 1 is a side elevation and longitudinal vertical section through a portion of a truck provided with the invention.

Figure 2 is a vertical transverse section through the truck shown in Figure 1.

Figures 3 to 7, inclusive, illustrate modified forms of the invention and each being a side elevation of the bracket and brake beam connected member.

Figure 8 is a vertical transverse section taken on the line 8—8 of Figure 7.

Figures 9 and 10 are side elevations of another form of the device.

Figure 11 is a front elevation of the structure of Figure 10.

Figure 12 is a side elevation of another form of device.

Figure 13 is a top view of the same.

Figure 14 is a side elevation of another form of device.

Figures 1 and 2 illustrate a truck of the type referred to having a side frame 1 mounted on journal boxes 2 carried by the axles 3 and the wheels 4. A bolster 5 rigidly connects the opposite side frames.

The side frame is provided with a brake hanger bracket 6 of any usual construction and a hanger 7 is suspended therefrom by the pin 8 and passes through a suitable recess in the brake head 9 to pivotally suspend the latter. The brake head is mounted on the usual brake beam here shown as a channel 10 extending transversely of the truck.

A bracket 11 extends inwardly from the lower central part of the side frame and may be made integral therewith or riveted, bolted or welded thereto. At the inner end of the bracket 11 there is a brake beam safety guard 12 extending longitudinally of the truck and beneath but normally spaced from the brake beam.

The brake beam and head are guided in their movement to and from the brake wheel by a two part device comprising a vertical arm 13, depending from the brake beam assembly, and a horizontal arm 14 extending rearwardly from the lower portion of arm 13 and terminating in a nose 15 engaging the inclined lower track or face 16 of bracket 11. Arms 13 and 14 are clamped together by the bolt 18 and may be secured in any desired relative position so as to accommodate variations in the relative heights of the brake beam and the side frame bracket.

Preferably, one or both of the arms 13 and 14 are roughened, as indicated at 19, to assist the bolts 18 in holding the parts in desired position.

As the brake head and beam swing to the right from the position shown in Figure 1, the pivotal movement of the head on the hanger is controlled by the movement of nose 15 along track 16, irrespective of any tendency of the brake beam to swing forwardly on the hanger.

In the form shown in Figure 3, the arms 21 and 22 are attached to each other by a freely pivoting joint 23 but the relative position of the arms and brake beam 24 and bracket 25 is yieldingly controlled by a spring 26 secured to arm 21 at 27 and engaging the underside of arm 22. The device will definitely control the angular position of the brake beam and head unless there is an application of force which will overcome the tension of spring 26, in which case the latter will yield to accommodate this force and avoid injury.

A lug 28 on arm 21 is adapted to engage the ends 29 of a recess formed in the adjacent portion of arm 22 so as to limit the pivotal movement of arm 22 on arm 21 and to maintain arm 22 in elevated position if spring 26 should break.

Figure 4 illustrates a similar yielding device in in which arms 30 and 31 are connected by a coil spring 32 extending diagonally of the members across the angle between them. At 33 is indicated means for limiting the relative movement of the arms similar to that shown in Figure 3.

In Figure 5 the element 34 secured to the brake beam assembly is in the form of an inverted cup and the element 35 has an upwardly extending arm telescoping vertically in element 34 and supported in a normal position by springs 36, the lower spring resting on a pin 37 which passes through a slot in arm 35 and limits the movement of the latter. The inner end of arm 35 engages bracket 38 and the springs 36 tend to maintain the angular relation between arms 34 and 35 but will yield to accommodate any unusual force tending to rotate the beam.

In Figure 6 a bracket contacting arm 39 is pivoted at 40 to the element 41 secured to the beam and springs 42 yieldingly hold the two elements 39 and 41 in the position shown in which they will maintain the desired angularity of the beam through the engagement of the iner end of arm 39 with the bracket 43 provided on the truck side frame.

In Figures 7 and 8, the element 44 attached to the brake beam assembly has a horizontal barrel 45 receiving a corresponding barrel 46 on the lower arm 47. A bolt 48 extends lengthwise through barrels 45 and 46 to form a pivot therefor and a spring 49 is anchored at its ends in openings 71 in the ends of barrels 45 and 46, respectively, and tends to hold the barrels in the relative position shown in Figure 7 whereby the engagement of the inner end of arm 47 with the bracket 50 maintains the desired angular position of the brake beam and head.

In Figure 9 the relation between arm 51 and arm 52 is yieldingly maintained by the spring 53 compressed between suitable seats 54 and 55 provided on the two arms.

In the structure of Figures 10 and 11, the entire guide device comprises a round wire spring 57 gripping the brake beam 58 at the side of the head and having an intermediate coil 59 and projecting rearwardly at 60 beneath the bracket 61.

Figures 12 and 13 illustrate a similar structure utilizing a flat spring 62 secured to the beam 63 and extending forwardly and downwardly and then rearwardly and upwardly to form an arcuate portion of substantial radius and length intermediate the ends which are secured to the beam and engage the bracket 64 respectively.

Figure 14 illustrates a form of the invention in which a clamp 65 on the beam 66 is provided with depending bolts 67 which mount pairs of springs 68 and these springs support bar 69 at spaced points to yieldingly support the same in the position shown in which the contact between the end of the bar and bracket 70 will hold the beam in desired angular position.

In all of the forms described, the device attached on the beam assembly engages a bracket on the side frame to maintain the desired angular position of the beam and brake head and shoe. Where the element attached to the beam assembly is rigid, it may form an integral part of, or an extension from, the brake head and is so illustrated in some of the modifications, particularly in Figure 9, but this is immaterial to the use of the member and it may be attached to the beam, or the head, in any convenient manner. In several forms the tension of the yielding connection between the parts of the guide arm may be varied as by providing additional openings 71 in members 45 and 46, Figures 7 and 8, to receive the ends of spring 47.

Obviously other modifications in the details of the structure may be made without departing from the spirit of the invention and we contemplate the exclusive use of all forms of the invention coming within the scope of the claims.

What is claimed is:

1. In a car truck, a side frame, a brake beam assembly suspended therefrom, a bracket on said frame at the rear of said assembly, an arm depending from said assembly, a second arm pivoted on the lower end of said first mentioned arm, and a spring extending between said arms and serving to hold the same under normal conditions in the desired position to guide the movement of said assembly to and from the wheel.

2. In a railway truck, a support, a brake beam assembly including a brake head, a bracket on said support at the rear of said beam, and a device for guiding the movement of said assembly to and from the wheels and comprising a portion projecting from said brake head, another portion engaging said bracket, and means adjustably securing said portions together.

3. A guide for a brake beam assembly comprising an arm for rigid attachment to said assembly, a second arm pivoted to said first mentioned arm for engaging a truck element, and a spring extending between said arms and maintaining the same in the desired relative position.

4. A guide for a brake beam assembly comprising an arm for rigid attachment to said beam assembly, a second arm pivoted to said first mentioned arm for engaging a truck element, a spring extending between said arms and maintaining the same in the desired relative position to guide the assembly in its movement to and from the wheel, and cooperating means on said arms for preventing said second mentioned arm from dropping in case said spring or its connections is broken.

5. In a railway truck, a support, a brake beam assembly, a bracket on said support at the rear of said assembly, a member extending from said assembly, an arm pivoted on the outer end of said member, and a spring extending between said member and said arm and serving to hold the same under normal conditions in the desired relative positions to guide the movement of said assembly.

JOHN A. BROSSART.
JONAS D. BIGELOW.
RAYMOND W. RETTERER.